United States Patent [19]

Cooper et al.

[11] 3,743,542

[45] July 3, 1973

[54] PAINT REMOVING METHOD

[75] Inventors: Joseph Cooper; William J. Corbett, both of Cincinnati, Ohio

[73] Assignee: Chemed Corporation, Cincinnati, Ohio

[22] Filed: May 28, 1971

[21] Appl. No.: 148,213

Related U.S. Application Data

[62] Division of Ser. No. 817,160, April 17, 1969, Pat. No. 3,629,004.

[52] U.S. Cl.................... 134/31, 134/11, 134/38, 252/162, 252/170, 252/171, 252/DIG. 8
[51] Int. Cl............................ B08b 7/00, C23g 5/02
[58] Field of Search................ 134/31, 38, 11, 22 R; 252/DIG. 8, 162, 170, 171

[56] References Cited

UNITED STATES PATENTS

| 608,948 | 8/1898 | Barnard et al.................. 134/31 X |
| 2,279,267 | 4/1942 | Kremers........................ 134/38 UX |
| 2,689,198 | 9/1954 | Judd ................................. 134/31 X |
| 2,956,911 | 10/1960 | Jelen................................. 134/22 R |

*Primary Examiner*—Morris O. Wolk
*Assistant Examiner*—D. G. Millman
*Attorney*—Eugene M. Bond and Kenneth E. Prince

[57] ABSTRACT

A method for removing paint from metal surfaces by boiling a solvent or solvent mixture and contacting the painted metal surface with the vapors of the solvent mixture.

10 Claims, No Drawings

PAINT REMOVING METHOD

This application for U.S. Letters Patent is a divisional of U.S. Ser. No. 817,160, filed Apr. 17, 1969, now U.S. Pat. No. 3,629,004.

This invention relates to a method for removing paint from metal surfaces by stripping with solvent vapors.

Paint stripping methods using liquid and paste compositions are well known in the art. Typically, the painted surfaces are immersed into hot alkaline baths for paint removal while in other instances a liquid or paste remover is applied to the painted surfaces and the treated paint is removed mechanically by scraping or the like. With some liquid and paste paint removers, the treated paint can be removed by washing.

Very adherent, durable paints and coatings based upon chemically resistant resins such as vinyl, acrylic, epoxy resins or the like have been developed which present a unique problem for coventional paint removal compositions. Although paint strippers have been developed for these durable paints, they have not proven entirely satisfactory from the standpoint of efficient, rapid, removal of such paints. Typically, these compositions require prolonged periods of treatment for complete stripping. The use of aqueous alkali solutions containing phenolic compounds such as cresylates have been employed as hot tank strippers with little commercial acceptance because of the disposal difficulty associated with phenolics.

It has now been found that by the practice of this invention, a method is provided for removing paint from metal surfaces by treating the paint with a solvent vapor which greatly facilitates paint removal. The present method is especially useful for removal of durable paints such as those based on vinyl, acrylic, or epoxy resins.

This invention, generally stated, involves a method for removing paint from metal surfaces by boiling a solvent or solvent mixture for the paint and contacting a metal surface coated with paint with a solvent vapor.

In the method of this invention, the paint stripping solvent or solvent mixture is heated to its boiling point and the painted metal surface is contacted with the vapors. The method is preferably carried out in a closed system to prevent loss of vapors and for safety purposes. An apparatus having the structure of a vapor degreasing machine may be used for this purpose if desired. The stripping apparatus preferably has a portion of the outside enclosed with cooling coils to provide a continuous refluxing of the solvent vapors. The particular apparatus employed, however, is not critical to the practice of this invention.

The method of this invention may be used for removing paints from a wide variety of metals including ferrous, copper, aluminum and like metals and their alloys. The paints which may be removed by this method include varnishes, enamels, lattices, emulsion coatings and the like. Conventional drying oil base paints, acrylic base paints, epoxy base paints, phenolic base paints, and rubber base paints may also be effectively removed. This method is particularly suitable for removing acrylic and epoxy base paints from ferrous metal surfaces such as steel.

The volatile solvents which may be used in the practice of the present invention include chlorinated liquid hydrocarbons, hydrogenated aromatic solvents, saturated heterocyclic compounds, surface active agents, imidazole derivatives, alkynyl alcohols, glycol ethers, carboxylic acids, ethanolated alkyl quanidine amine complexes, and aliphatic alcohols.

Chlorinated liquid hydrocarbons found useful herein include methylene chloride, trichloroethylene, perchloroethylene, trichlorobenzene, orthodichlorobenzene and the like.

Hydrogenated aromatic solvents found useful herein include tetrahydronaphthalene and the like.

Saturated heterocyclic compounds found useful herein include compounds containing nitrogen, oxygen, or both nitrogen and oxygen in the basic structure such as morpholine, N-methyl morpholine, thiomorpholine, dioxane, tetrahydrofuran and the like.

Surface active agents found useful herein include alkyl benzene sulfonic acid where the alkyl group includes from about eight to about 18 carbon atoms such as dodecyl benzene sulfonic acid.

Imidazole derivatives found useful herein include materials such as those sold under the trade name Miranol CS, an alkyl(coco) ethyl cycloiminidium 1-hydroxy 3-ethanol 2-isopropyl sodium sulfonate; Miranol JS, an alkyl(octoic) ethyl cyclominidium 1-hydroxy, 3-ethanol 2-isopropl sodium sulfonate; or the like.

"Miranols" are synthetic detergents disclosed in U.S. Pat. Nos. 2,528,378 and 2,773,068 (incorporated herein by reference) and have the formula

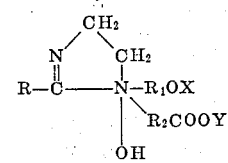

wherein R is a hydrocarbon radical having from four to 18 carbons, $R_1$ is a hydrocarbon radical having from one to four carbons, $R_2CO$ is an acyl radical having from one to four carbons, X is H, Na, K, —CH$_2$COONa, —CH$_2$COOK or —CH$_2$COOH, and Y is H, Na, or K.

Alkynyl alcohols found useful herein are exemplified by 3,5-dimethyl-1-hexyn-3ol and the like.

Glycol ethers found useful herein include materials such as ethylene glycol monomethyl ether, ethylene glycol monethyl ether, ethylene glycol phenyl ether, propylene glycol methyl ether, and ethoxytriglycol or the like.

Carboxylic acids found useful herein are those having one to about four carbon atoms and include formic acid, acetic acid, propionic acid, and butyric acid.

Ethanolated alkyl guanidine amine complexes usefully employed herein include materials such as that sold under the trade name Aerosol 61 (an ethylene oxide adduct of octadecyl quanidine-amine or the like Aliphatic alcohols found useful herein include alcohols such as methyl isobutyl carbinol and the like.

Mixtures of useful solvents may also prove useful in the practice of the present invention. For example, mixtures of about 10 to about 90 parts by weight morpholine with correspondingly about 90 to about 10 parts by weight of a solvent selected from the group consisting of chlorinated liquid hydrocarbons, hydrogenated aromatic hydrocarbons, glycol ethers and mixtures thereof have been found useful. Mixtures of about 10 to about 90 parts by weight of a chlorinated hydrocarbon selected from the group consisting of methylene chloride and perchlorethylene with correspondingly about 90 to about 10 parts by weight of solvents selected from the group consisting of alkyl benzene sulfonic acids, lower aliphatic alcohols and their glycol ethers, alkynyl alcohols, hydrogenated aromatic hydrocarbons, carboxylic acids containing one to four carbon atoms, imidazole derivatives, ethanolated quanidine amine complexes and mixtures thereof may also provide effective in the practice of the present invention.

The compounds of this invention have been found to give the greatest penetration and stripping properties for acrylic enamels. Almost complete paint removal without any mechanical treatment has been observed.

In order to further illustrate the present invention, the following examples are given wherein all parts are by weight unless otherwise indicated.

EXAMPLE 1

Paint hooks having 4 inch long sections coated with one-eighth inch thick Jones Dabney polymerized acrylamide paint accumulation were placed over beakers containing 83 parts by weight methylene chloride, 10 parts by weight of 90 percent formic acid, and 1 part by weight of an imidazoline surfactant having the following formula:

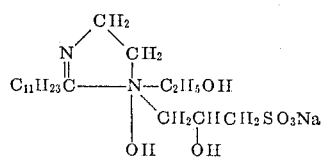

This formulation appeared as a clear, amber mixture which boiled at 104°F. The paint hooks were exposed to vapors of this formulation for about 30 minutes after which time loose accumulated paint was brushed off. The hooks were re-exposed to vapors of this formulation for 15 minutes and about 98 percent of the paint accumulation was removed. When hooks having this accumulation of paint are processed by hot tank alkaline stripping methods, a period of up to 4 hours is usually required for comparable paint removal.

EXAMPLE 2

Paint hooks having 4 inch long sections coated with one-eighth inch thick Jones Dabney polymerized acrylamide paint accumulation were treated to remove the paint. The hooks were placed over beakers containing a mixture of 50 parts by weight morpholine and 50 parts by weight tetrahydronaphthalene. Vapors of this mixture from a solvent boiling temperature of 104°F. were contacted with the accumulated paint. The effect of the vapor penetration was readily evident. After a 60 minute interval, the paint had been 90 percent removed. Usually this accumulation of paint requires 3 to 4 hours for complete removal by using hot tank alkaline stripping methods.

EXAMPLES 3–17

The procedure of Example 2 was repeated with paint hooks having similar paint accumulation thereon. The time of exposure varied from 15 to 35 minutes using the following formulations in amounts indicated:

EXAMPLE 3

| Ingredients | Parts by Weight |
| --- | --- |
| Methylene Chloride | 83 |
| Formic Acid (90%) | 10 |
| Imidazoline Surfactant of Example 1 | 1 |
| Linear Dodecyl Benzene Sulfonic Acid | 6 |

EXAMPLE 4

| Ingredients | Parts by Weight |
| --- | --- |
| Methylene Chloride | 73 |
| Formic Acid (90%) | 10 |
| Linear Dodecyl Benzene Sulfonic Acid | 1 |
| Ethylene Glycol Phenyl Ether | 10 |

EXAMPLE 5

| Ingredients | Parts by Weight |
| --- | --- |
| Methylene Chloride | 80 |
| Formic Acid (90%) | 10 |
| Ethylene Glycol Phenyl Ether | 6 |
| Guanidine Amine Complex | 4 |

EXAMPLE 6

| Ingredients | Parts by Weight |
| --- | --- |
| Methylene Chloride | 80 |
| Formic Acid (90%) | 11 |
| Ethylene Glycol Methyl Ether | 8 |
| 3,5-Dimethyl-1-hexyn-3ol | 1 |

EXAMPLE 7

| Ingredients | Parts by Weight |
| --- | --- |
| Methylene Chloride | 63.76 |
| Formic Acid (90%) | 17 |
| Imidazoline Surfactant of Example 1 | 6 |
| Linear Dodecyl Benzene Sulfonic Acid | 6 |
| Perchloroethylene | 11.25 |

EXAMPLE 8

| Ingredients | Parts by Weight |
| --- | --- |
| Morpholine | 10 |
| Orthodichlorobenzene | 90 |

EXAMPLE 9

| Ingredients | Parts by Weight |
| --- | --- |
| Morpholine | 10 |
| Ethoxytriglycol | 90 |

EXAMPLE 10

| Ingredients | Parts by Weight |
| --- | --- |
| Morpholine | 100 |

EXAMPLE 11

| Ingredients | Parts by Weight |
| --- | --- |
| Methylene Chloride | 90 |
| Methyl-iso-butyl-carbinol | 10 |

EXAMPLE 12

| Ingredients | Parts by Weight |
| --- | --- |
| Methylene Chloride | 90 |
| Tetrahydronaphthalene | 10 |

EXAMPLE 13

| Ingredients | Parts by Weight |
| --- | --- |
| Methylene Chloride | 50 |
| Tetrahydronaphthalene | 50 |

EXAMPLE 14

| Ingredients | Parts by Weight |
| --- | --- |
| Methylene Chloride | 47.6 |
| Formic Acid (90%) | 48 |
| Tetrahydronaphthalene | 47.6 |

EXAMPLE 15

| Ingredients | Parts by Weight |
|---|---|
| Methylene Chloride | 77.5 |
| Formic Acid (90%) | 10 |
| Linear Dodecyl Benzene Sulfonic Acid | 2.5 |
| Tetraphdronaphthalene | 10 |

EXAMPLE 16

| Ingredients | Parts by Weight |
|---|---|
| Methylene Chloride | 38.75 |
| Formic Acid (90%) | 5 |
| Linear Dodecyl Benzene Sulfonic Acid | 1.25 |
| Tetrahydronaphthalene | 55 |

EXAMPLE 17

| Ingredients | Parts by Weight |
|---|---|
| Morpholine | 50 |
| Tetrahydronaphthalene | 50 |

In all of the above instances of Examples 3–17, 75% to 100% of the paint accumulation on the hooks was removed.

EXAMPLE 18

4 inches × 6 inches steel panels having four coats of Pittsburgh Plate Glass Duracor 100 acrylic paint in addition to an epoxy primer were treated to remove the paint accumulation. The steel panels were placed over beakers containing a mixture of 73 parts by weight methylene chloride, 10 parts by weight of 90 percent formic acid, 7 parts by weight of weight linear dodecyl benzene sulfonic acid and 10 parts by weight ethylene glycol phenyl ether. Vapors of this mixture were contacted with the accumulated paint. The effect of the vapor penetration was immediately evident. After an interval of 17 minutes, from 95–98 percent of the paint was removed from the steel panels. Usually this accumulation of paint requires 60 minutes by using the most effective hot tank alkaline stripping methods.

EXAMPLES 19–26

The procedure of Example 18 was repeated with steel panels having similar paint accumulation thereon. The time of exposure varied from 15 to 30 minutes using the following formulations in amounts indicated:

EXAMPLE 19

| Ingredients | Parts by Weight |
|---|---|
| Perchlorethylene | 50 |
| Ethylene Glycol Methyl Ether | 50 |

EXAMPLE 20

| Ingredients | Parts by Weight |
|---|---|
| Perchlorethylene | 33 |
| Ethylene Glycol Methyl Ether | 33 |
| Morpholine | 33 |

EXAMPLE 21

| Ingredients | Parts by Weight |
|---|---|
| Perchlorethylene | 70 |
| Ethylene Glycol Methyl Ether | 10 |
| Methylene Chloride | 20 |

EXAMPLE 22

| Ingredients | Parts by Weight |
|---|---|
| Methylene Chloride | 80 |
| Formic Acid (90%) | 10 |
| Propylene Glycol | 10 |

EXAMPLE 23

| Ingredients | Parts by Weight |
|---|---|
| Methylene Chloride | 74.5 |
| Formic Acid (90%) | 9.3 |
| Water | 3.7 |
| Linear Dodecyl Benzene Sulfonic Acid | 7.0 |
| Imidazoline Surfactant of Example 1 | 5.5 |

EXAMPLE 24

| Ingredients | Parts by Weight |
|---|---|
| Methylene Chloride | 60 |
| Formic Acid (90%) | 20 |
| Propylene Glycol Methyl Ether | 10 |
| Linear Dodecyl Benezene Sulfonic Acid | 10 |

EXAMPLE 25

| Ingredients | Parts by Weight |
|---|---|
| Methylene Chloride | 75 |
| Formic Acid (90%) | 10 |
| Propylene Glycol Methyl Ether | 8 |
| Linear Dodecyl Benzene Sulfonic Acid | 7 |

EXAMPLE 26

| Ingredients | Parts by Weight |
|---|---|
| Methylene Chloride | 73 |
| Formic Acid (90%) | 10 |
| Linear Dodecyl Benzene Sulfonic Acid | 7 |
| Ethylene Glycol Phenyl Ether | 10 |

In all of the above instances of Examples 19–26, 85 percent to 98 percent of the paint accumulation on the panels was removed.

EXAMPLE 27

Paint hooks having 4 inch long sections coated with one-sixteenth inch accumulation of Glidden acrylic paint were treated for removal. These removal. These hooks were placed over beakers containing a mixture of 80 parts by weight methylene chloride and 20 parts by weight 90 percent formic acid. Vapors of this mixture were contacted with the accumulated paint. The effect of the vapor penetration was readily evident. After a 20 minute interval, 85–90 percent of the paint accumulation was removed from the metal hooks. Usually, this accumulattion of paint requires several hours for comparable paint removal by using hot tank alkaline stripping methods.

EXAMPLE 28–30

The procedure of Example 27 was repeated with paint hooks having similar paint accumulation thereon. The time of exposure varied from 20 to 30 minutes using the following formulations in amounts indicated:

EXAMPLE 28

| Ingredients | Parts by Weight |
|---|---|
| Perchlorethylene | 36.4 |
| Methylene Chloride | 36.4 |
| Formic Acid (90%) | 18.2 |
| Linear Dodecyl Benzene Sulfonic Acid | 9.0 |

EXAMPLE 29

| Ingredients | Parts by Weight |
|---|---|
| Perchlorethylene | 30 |
| Methylene Chloride | 50 |
| Di-tri-isopropanolamine | 20 |

EXAMPLE 30

| Ingredients | Parts by Weight |
|---|---|
| Methylene Chloride | 80 |
| Formic Acid (90%) | 10 |
| Propylene Glycol Methyl Ether | 10 |

In all of the above instances of Examples 28–30, 85% to 98% of the paint accumulation on the hooks was removed.

EXAMPLE 31

Paint hooks having 4 inch long section coated with one-fourth to one-half inch accumulation of Ford Automatic J–32 Acrylic paint were treated for paint removal. These hooks were placed over beakers containing a mixture of 36.4 parts by weight perchloroethylene, 36.4 polychlorobenzene, 9 parts by weight linear dodecyl benzene sulfonic acid, and 18.2 parts by weight of 90% formic acid. Vapors of this mixture were contacted with the accumulated paint. After 3–4 minutes, 85–90 percent of the paint had been removed. The usual time required for complete stripping of Ford Automotive J–32 Acrylic paint ranges up to 32 hours by using hot tank alkaline stripping methods.

EXAMPLES 32–34

The procedure of Example 31 was repeated with paint hooks having similar paint accumulation thereon. The time of exposure varies but in all instances was less than 45 minutes using the following formulations in amounts indicated:

EXAMPLE 32

| Ingredients | Parts by Weight |
|---|---|
| Perchloroethylene | 90 |
| Morpholine | 10 |

EXAMPLE 33

| Ingredients | Parts by Weight |
|---|---|
| Perchloroethylene | 80 |
| Linear Dodecyl Benzene Sulfonic Acid | 20 |

EXAMPLE 34

| Ingredients | Parts by Weight |
|---|---|
| Perchloroethylene | 50 |
| Ethyoxytriglycol | 50 |

In all of the above instances of Examples 32–34, 75 percent to 100 percent of the paint accumulation was removed.

It is understood that the foregoing detailed description is given merely by way of illustration and that many variations may be made therein without departing from this invention.

What is claimed is:

1. A method for removing paint from a metal surface which method comprises, heating a volatile paint solvent to boiling, contacting the painted metal surface with vapors of the heated paint solvent, and thereafter removing at least a substantial amount of paint from the metal surface, said volatile paint solvent being a mixture of about 10 to about 90 parts by weight morpholine with corresondingly about 90 to about 10 parts by weight of a solvent selected from the group consisting of chlorinated liquid hydrocarbons, hydrogenated aromatic hydrocarbons, glycol ethers and mixtures thereof.

2. The method of claim 1 wherein the volatile solvent is formed of 33 parts by weight each of perchloroethylene, ethylene glycol methyl ether and morpholine.

3. The method of claim 1 wherein the volatile solvent is formed of 10 parts by weight of morpholine and 90 parts by weight of orthodichlorobenzene.

4. The method of claim 1 wherein the volatile solvent is formed of 10 parts by weight of morpholine and 90 parts by weight of ethoxytriglycol.

5. The method of claim 1 wherein the volatile solvent is formed of 90 parts by weight of perchloroethylene and 10 parts by weight of morpholine.

6. A method for removing paint from a metal surface which method comprises, heating a volatile paint solvent to boiling, contacting the painted metal surface with vapors of the heated paint solvent, and thereafter removing at least a substantial amount of paint from the metal surface, said volatile paint solvent formed of a mixture of 50 parts by weight of a component selected from the group consisting of morpholine, methylene chloride, and perchlorethylene; and 50 parts by weight of a second component selected from the group consisting of tetrahydronaphthalene, ethylene glycol methyl ether, and ethoxytriglycol.

7. The method of claim 6 wherein the volatile solvent is formed of 50 parts by weight morpholine and 50 parts by weight tetrahydronaphthalene.

8. The mehod of claim 6 wherein the volatile solvent is formed of 50 parts by weight of methylene chloride and 50 parts by weight of tetrahydronaphthalene.

9. The method of claim 6 wherein the volatile solvent is formed of 50 parts by weight of perchloroethylene and 50 parts by weight of ethylene glycol methyl ether.

10. The method of claim 6 wherein the volatile solvent is formed of 50 parts by weight of perchloroethylene and 50 parts by weight of ethoxytriglycol.

* * * * *